US009487266B2

(12) United States Patent
Yamanaka et al.

(10) Patent No.: US 9,487,266 B2
(45) Date of Patent: Nov. 8, 2016

(54) BICYCLE CRANK AXLE ASSEMBLY

(71) Applicant: Shimano Inc., Sakai, Osaka (JP)

(72) Inventors: Masahiro Yamanaka, Osaka (JP);
Yusuke Nishimoto, Osaka (JP); Shingo Shiraishi, Yamaguchi (JP); Akinobu Sugimoto, Osaka (JP)

(73) Assignee: Shimano Inc., Osaka (JP)

( * ) Notice: Subject to any disclaimer, the term of this patent is extended or adjusted under 35 U.S.C. 154(b) by 237 days.

(21) Appl. No.: 14/167,105

(22) Filed: Jan. 29, 2014

(65) Prior Publication Data

US 2014/0144285 A1 May 29, 2014

Related U.S. Application Data

(62) Division of application No. 13/304,336, filed on Nov. 24, 2011, now Pat. No. 8,677,859.

(51) Int. Cl.
*B62M 3/00* (2006.01)

(52) U.S. Cl.
CPC ............... *B62M 3/003* (2013.01); *B62M 3/00* (2013.01); *Y10T 74/2164* (2015.01)

(58) Field of Classification Search
CPC .............................. B62M 3/003; B62M 3/00
See application file for complete search history.

(56) References Cited

U.S. PATENT DOCUMENTS

| 4,331,043 | A | 5/1982 | Shimano |
| 7,503,700 | B2 | 3/2009 | Yamanaka et al. |
| 7,650,818 | B2 | 1/2010 | Inoue et al. |
| 2004/0162172 | A1 | 8/2004 | Yamanaka et al. |
| 2006/0053962 | A1 | 3/2006 | Chiang |
| 2006/0117905 | A1 | 6/2006 | Yamanaka et al. |
| 2006/0288818 | A1 | 12/2006 | Meggiolan |
| 2007/0095164 | A1 | 5/2007 | Yamanaka et al. |
| 2007/0137428 | A1 | 6/2007 | Yamanaka et al. |
| 2008/0245180 | A1 | 10/2008 | Huang |
| 2008/0247695 | A1* | 10/2008 | Yamanaka ............... F16C 3/08 384/458 |
| 2010/0326233 | A1 | 12/2010 | Schlanger |
| 2012/0079914 | A1* | 4/2012 | Kao ..................... B62M 3/00 74/594.1 |

FOREIGN PATENT DOCUMENTS

| EP | 1342656 A2 | 9/2003 |
| EP | 1449760 A2 | 8/2004 |
| JP | 517855 U | 1/1976 |

OTHER PUBLICATIONS

European Search Report of corresponding European Application No. 12 16 9428.5 dated Apr. 5, 2013.

* cited by examiner

*Primary Examiner* — Vicky Johnson
(74) *Attorney, Agent, or Firm* — Global IP Counselors

(57) ABSTRACT

A bicycle crank axle assembly has first and second crank arms that are attached to opposite ends of a crank axle. The ends of the crank axle are non-rotatably disposed in axle mounting openings of the first and second crank arms. A first end of the crank axle has at least one axially extending first spline that protrudes radially outward from an outer peripheral surface of its middle body portion. The at least one axially extending first spline non-rotatably couples the crank axle to the first crank arm and prevents outward axial movement of the first crank arm away from the second crank arm. The second end portion of the crank axle has at least one recess that extend radially inward with respect to the outer peripheral surface of the middle body portion to form at least one axially extending second spline.

17 Claims, 9 Drawing Sheets

BICYCLE CRANK AXLE ASSEMBLY

CROSS-REFERENCE TO RELATED APPLICATIONS

This application is a divisional application of U.S. patent application Ser. No. 13/304,336 filed on Nov. 24, 2011. The entire disclosure of U.S. patent application Ser. No. 13/304,336 is hereby incorporated herein by reference.

BACKGROUND

1. Field of the Invention

This invention generally relates to a bicycle crank axle assembly. More specifically, the present invention relates to a bicycle crank axle assembly having an attachment structure between a pair of crank arms and a crank axle.

2. Background Information

Generally speaking, a conventional bicycle has a diamond-shaped bicycle frame with a pair of wheels rotatably mounted to the frame and a drive train coupled to the frame for driving the rear wheel. The drive train typically has a bicycle crank assembly mounted to the cylindrical or tubular hanger part of the bicycle frame. The bicycle crank assembly drives a chain that rotates a sprocket mounted to the rear wheel. The bicycle crank assembly usually includes a crank axle that is mounted in a freely rotatable-manner to a hanger tube of the bicycle frame. A crank arm is fastened to each end of the crank axle. The right crank arm typically has one or more sprockets attached thereto for driving the chain. As used herein, the terms "right" and "left" are often used to describe bicycle components on the assumption that the bicycle is viewed from the rear.

SUMMARY

One aspect presented in this disclosure is to provide a bicycle crank assembly that is relatively easy to assemble.

In view of the state of the known technology, a bicycle crank assembly is presented in this disclosure that comprises a first crank arm, a second crank arm and a crank axle. The first crank arm includes a first axle mounting opening that is through bore. The second crank arm includes a second axle mounting opening. The crank axle includes a first end portion, a second end portion and a middle body portion located between the first and second end portions, the crank axle being mounted in the first axle mounting opening of the first crank arm with a non-interference fit therebetween, and the first end portion of the crank axle is attached to the first axle mounting opening by adhesive. The first end portion of the crank axle has at least one axially extending first spline that protrudes radially outward from an outer peripheral surface of the middle body portion, the first end portion of the crank axle being disposed in the first axle mounting opening, the at least one axially extending first spline non-rotatably coupling the crank axle to the first crank arm and preventing outward axial movement of the first crank arm away from the second crank arm along the crank axle, the second end portion of the crank axle having at least one recess that extend radially inward with respect to the outer peripheral surface of the middle body portion to form at least one axially extending second spline, the second end portion of the crank axle being non-rotatably disposed in the second axle mounting opening.

These and other objects, features, aspects and advantages of the bicycle crank assembly presented in this disclosure will become apparent to those skilled in the art from the following detailed description, which, taken in conjunction with the annexed drawings, discloses several embodiments.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
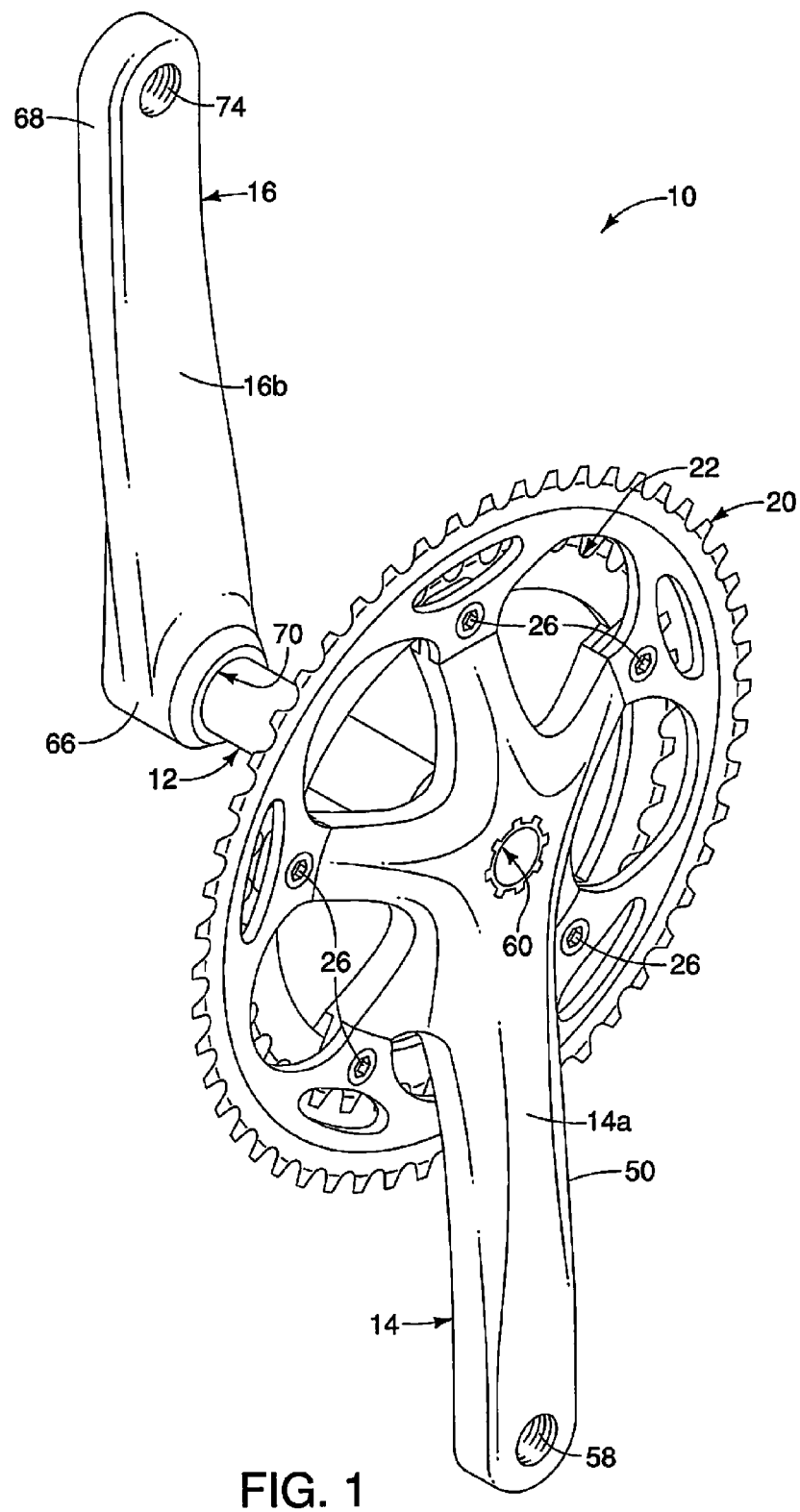
FIG. 1 is an assembled perspective view of a bicycle crank assembly in accordance with a first embodiment.
Figure 2:
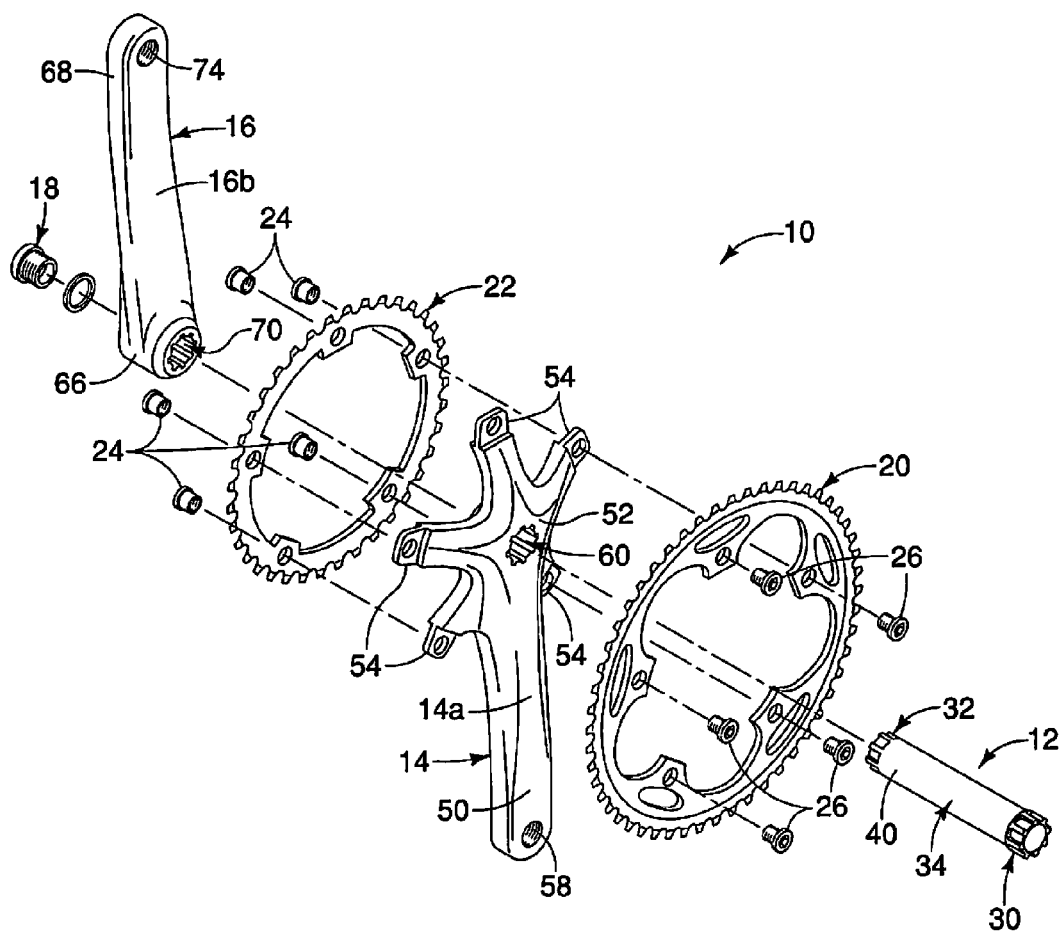
FIG. 2 is an exploded perspective view of the bicycle crank assembly illustrated in FIG. 1.
Figure 3:
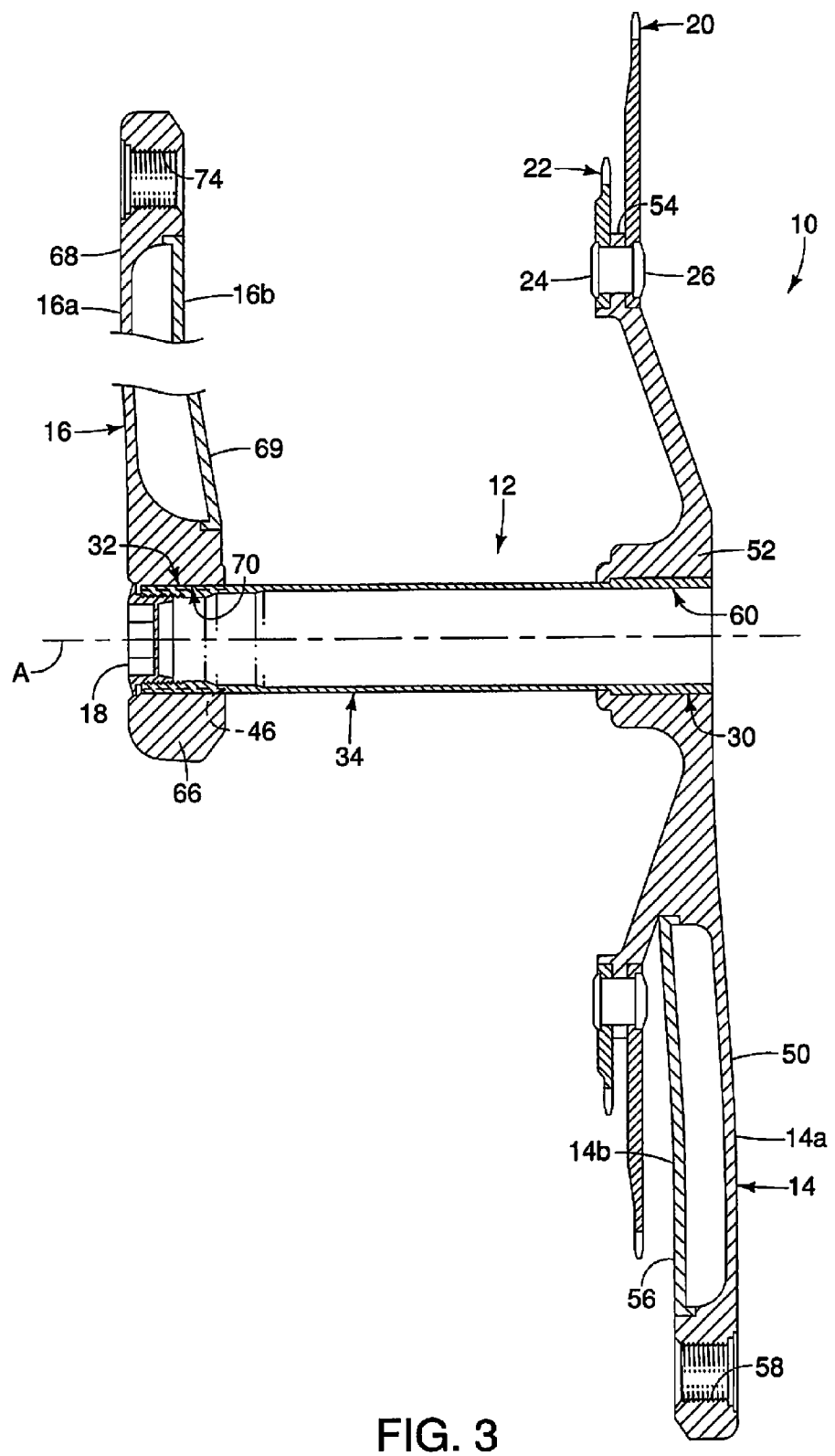
FIG. 3 is a transverse cross sectional view of the bicycle crank assembly illustrated in FIGS. 1 and 2 with the cross section taken along the center longitudinal axis of the crank axle and generally bisecting the crank arms in the lengthwise direction.

Referring to FIGS. 1 to 7, a bicycle crank axle assembly 10 is illustrated in accordance with a first embodiment. As seen in FIGS. 1 to 3, the bicycle crank axle assembly 10 includes a crank axle 12, a first (right) crank arm 14 and a second (left) crank arm 16. The first crank arm 14 is fixed to a first (right) end portion of the crank axle 12, while the second crank arm 16 is fixed to a second (left) end portion of the crank axle 12. Basically, the first and second crank arms 14 and 16 are secured to the crank axle 12 using only a fixing bolt 18. As shown in FIG. 3, the first and second crank arms 14 and 16 are fixed to opposite end portions of the crank axle 12 and extend in opposite directions. The first crank arm 14 has a first axially outward facing surface 14a and a first axially inward facing surface 14b. The second crank arm 16 has a second axially outward facing surface 16a and a second axially inward facing surface 16b. The second crank arm 16 is removably fastened to the crank axle 12 by the fixing bolt 18, while the first crank arm 14 is preferably fixed to the crank axle 12 so that the first crank arm 14 is integrally coupled to the crank axle 12 through a splined-connection as discussed below.

In the first illustrated embodiment, the bicycle crank axle assembly 10 further includes a pair of sprockets or chainrings 20 and 22. The first crank arm 14 has a spider arms for attaching the sprockets 20 and 22 with a plurality of fasteners (e.g., chainring nuts 24 and chainring bolts 26). The sprockets 20 and 22 are fixedly secured to the first crank arm 14 in a releasable and reinstallable manner. Basically, the sprockets 20 and 22 and their attachments to the first crank arm 14 are conventional and can be any suitable configuration. Moreover, the first crank arm 14 can be configured such that only one sprocket is attached thereto the first crank arm 14 or more than two sprockets are attached to the first crank arm 14. Thus, the sprockets 20 and 22 and their attachments to the first crank arm 14 will not be discussed and/or illustrated in detail herein.

Now, the crank axle 12 will be discussed in more detail. In the first illustrated embodiment, the crank axle 12 is a hollow pipe-shaped member that is highly rigid. For example, the crank axle 12 is made of a metallic material as chrome molybdenum steel. Preferably, the crank axle 12 defines a longitudinal axis A that substantially coincides with a rotational center axis of a bottom bracket when installed in a hanger tube of a bicycle. The crank axle 12 includes a first end portion 30, a second end portion 32 and a middle body portion 34 located between the first and second end portions 30 and 32. The first end portion 30 has a maximum outer dimension D1 (diameter or transverse width). The second end portion 32 and the middle body portion 34 both have a maximum outer dimension D2 (diameter or transverse width) that is smaller than the maximum diameter D1 of the first end portion 30.

Preferably, the first end portion 30 of the crank axle 12 has a plurality of first splines 36, while the second end portion 32 of the crank axle 12 has a plurality of second splines 38. The first and second splines 36 and 38 are axially extending splines that are circumferentially spaced apart around the first and second end portions 30 and 32 of the crank axle 12, respectively. Alternatively, the first and second end portions 30 and 32 of the crank axle 12 can be provided with fewer or more splines than illustrated (e.g., at least one axially extending spline at each end portion). As explained below, the first splines 36 non-rotatably couple the first end portion 30 of the crank axle 12 to the first crank arm 14 and prevent outward axial movement of the first crank arm 14 away from the second crank arm 16 along the crank axle 12. The second splines 38 non-rotatably couple the second end portion 32 of the crank axle 12 to the second crank arm 16.

Basically, the first splines 36 protrudes radially outward from an outer peripheral surface 40 of the middle body portion 34 to define an axially facing abutment 42. The axially facing abutment 42 is formed by the ends of the first splines 36 that face towards the second end portion 32 of the crank axle 12. On the other hand, the second splines 38 are defined by a plurality of recesses 44 that extend radially inward with respect to the outer peripheral surface 40 of the middle body portion 34. Thus, the second splines 38 have an outermost crest that is almost flush with respect to the outer peripheral surface 40 of the middle body portion 34. Alternatively, the second splines 38 may also have an outermost crest that is recessed with respect to the outer peripheral surface 40 of the middle body portion 34. Since the recesses 44 extend radially inward with respect to the outer peripheral surface 40 of the middle body portion 34, an axially facing abutment 46 is formed at the end of each of the recesses 44 at the middle body portion 34.

Figure 4:
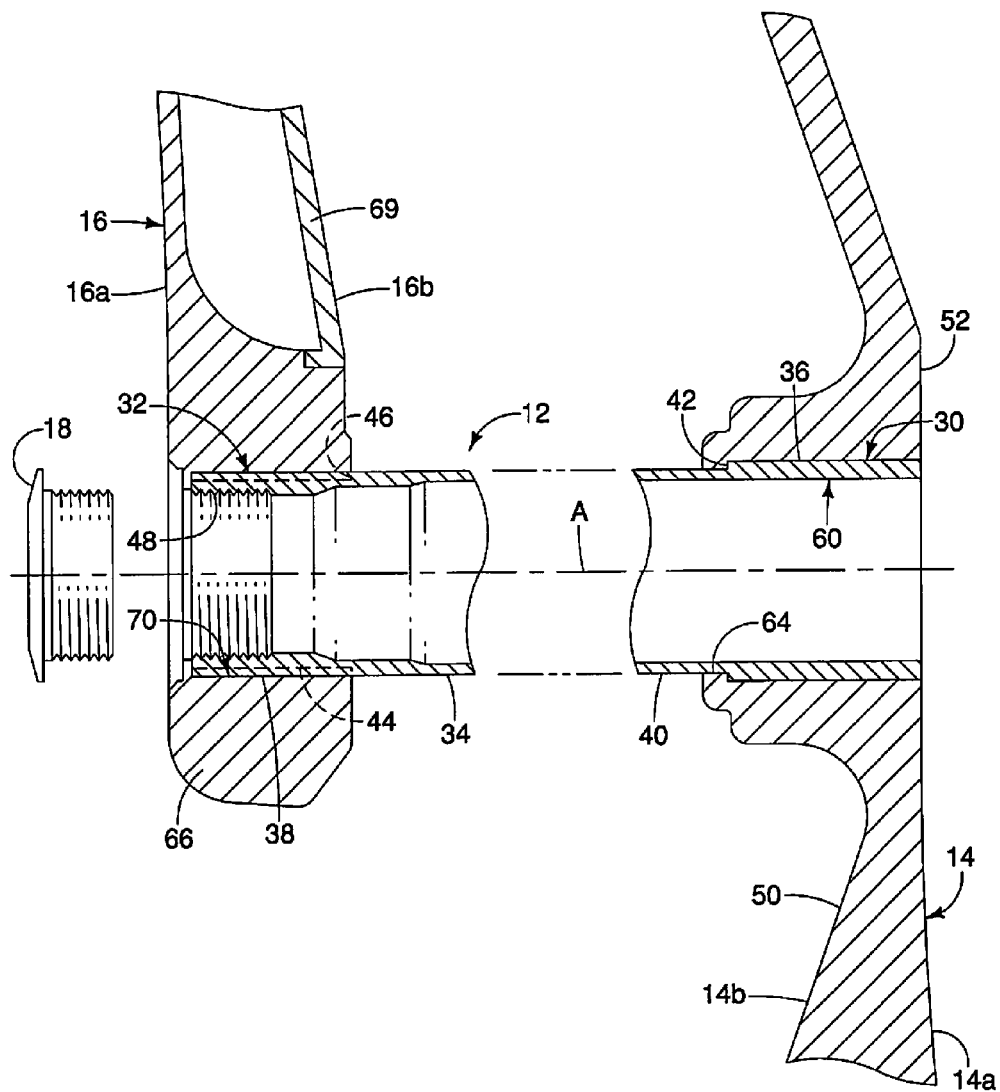
FIG. 4 is an enlarged partial cross sectional view of selected portions of the bicycle crank assembly illustrated in FIGS. 1 to 3.

As seen in FIG. 4, the second end portion 32 of the crank axle 12 has an internal thread 48. The fixing bolt 18 is threaded into the internal thread 48 to secure the second end portion 32 of the crank axle 12 to the second crank arm 16. In particular, the axially facing abutments 46 formed at the ends of the recesses 44 at the middle body portion 34 contact the axially inside surface of the crank axle 12, while the fixing bolt 18 contacts the axially outside surface of the crank axle 12. In this way, as seen in FIG. 3, the second crank arm 16 is sandwiched between the fixing bolt 18 and the axially facing abutments 46 of the crank axle 12.

Now, the first crank arm 14 will be discussed in more detail. The first crank arm 14 includes a crank body portion 50, a crank axle attachment portion 52 and a plurality of sprocket attachment portions 54. The first crank arm 14 is illustrated as being formed with a two-piece construction from a light metal such as an aluminum alloy, a magnesium alloy, a titanium alloy, or other suitable light metal. In particular, the crank body portion 50 has an interior space that is covered by a metallic cover member 56. The metallic cover member 56 is fixedly attached (i.e., bonded) to a one-piece metallic body member that includes the crank body portion 50, the crank axle attachment portion 52, the sprocket attachment portions 54. As a result, the crank body portion 50 has an interior space to reduce the weight of the first crank arm 14. This interior space can be empty or filled with a resin material as needed and/or desired. However, the first crank arm 14 is not limited to this construction. The first crank arm 14 can be formed of a single piece or of several pieces of various materials.

The crank body portion 50 has tip or free end portion with a pedal attachment hole 58 that is threaded for threadedly attaching a pedal (not shown) as best seen in FIG. 3. The tip or free end portion of the crank body portion 50 constitutes a pedal attachment portion. The crank axle attachment portion 52 has a first axle mounting opening 60 that has a plurality of splines 62 (FIG. 6) for engaging the first splines 36 of the crank axle 12 to prevent rotation therebetween as seen in FIG. 4. The first axle mounting opening 60 is through bore.

The first crank arm 14 includes an axially facing abutment 64 within the first axle mounting opening 60. Such an axially facing abutment 64 is formed before the first crank arm 14 and the crank axle 12 are assembled with each other. The axially facing abutment 64 is integrally formed as a unitary piece of the crank axle attachment portion 52. The axially facing abutment 64 is an annular abutment. However, the axially facing abutment 64 can be a singular non-annular abutment or a plurality of abutments as needed and/or desired. Preferably, the axially facing abutment 64 includes at least one projection extending radially inwardly from an inner peripheral surface of the first axle mounting opening 60. The axially facing abutment 64 defines a minimum inner dimension of the first axle mounting opening 60. The second end portion 32 and the middle body portion 34 of the crank axle 12 have the maximum outer dimension D2 that is smaller than the minimum inner dimension of the first axle mounting opening 60 so that the second end portion 32 and the middle body portion 34 of the crank axle 12 can pass through the first axle mounting opening 60. In this way, the second end portion 32 and the middle body portion 34 of the crank axle 12 can be inserted through the first axle mounting opening 60 from the first axially outward facing surface 14a of the first crank arm 14 to the first axially inward facing surface 14b of the first crank arm 14 until the axially facing abutment 42 of the crank axle 12 contacts the axially facing abutment 64 of the first crank arm 14. Thus, the second end portion 32 and the middle body portion 34 are shaped so that the second end portion 32 and the middle body portion 34 are capable of freely passing through the first axle mounting opening 60 for mounting the first end portion 30 of the crank axle 12 in the first axle mounting opening 60 of the first crank arm 14.

The first end portion 30 of the crank axle 12 is dimensioned relative to the first axle mounting opening 60 such that the first end portion 30 of the crank axle 12 is fixedly mounted in the first axle mounting opening 60 of the first crank arm 14 with an interference fit (i.e. a press-fit) therebetween.

Now, the second crank arm 16 will be discussed in more detail. The second crank arm 16 includes a crank axle attachment portion 66 and a pedal attachment portion 68. The second crank arm 16 is illustrated as being formed with a two-piece construction from a light metal such as an aluminum alloy, a magnesium alloy, a titanium alloy, or other suitable light metal. In particular, the second crank arm 16 has an interior space that is covered by a metallic cover member 69. The metallic cover member 69 is fixedly attached (i.e., bonded) to the second crank arm 16. As a result, the second crank arm 16 has an interior space to reduce the weight of the second crank arm 16. This interior space can be empty or filled with a resin material as needed and/or desired. However, the second crank arm 16 is not limited to this construction. The second crank arm 16 can be formed of a single piece or of several pieces of various materials.

Figure 5:
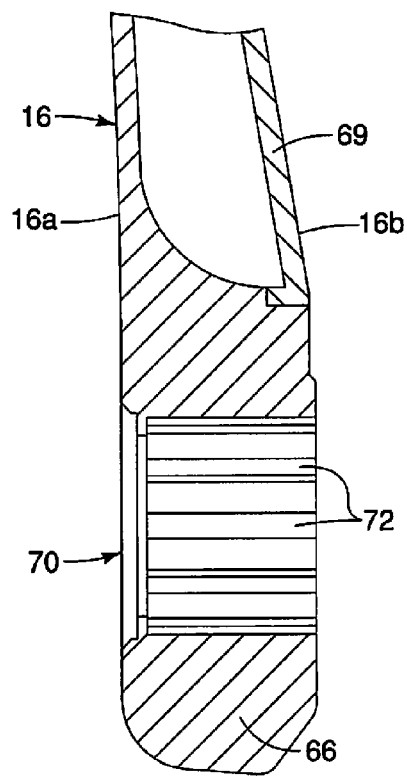
FIG. 5 is an enlarged partial cross sectional view of the crank axle attachment portion of the left bicycle crank arm for the bicycle crank assembly illustrated in FIGS. 1 to 4.
Figure 6:
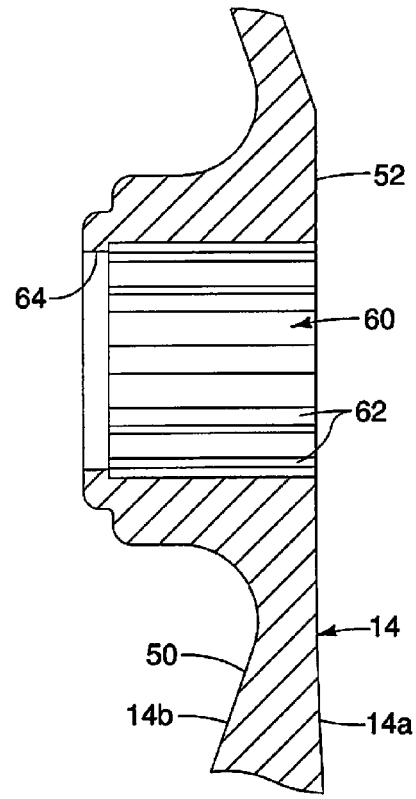
FIG. 6 is an enlarged partial cross sectional view of the crank axle attachment portion of the right bicycle crank arm for the bicycle crank assembly illustrated in FIGS. 1 to 4.
Figure 7:
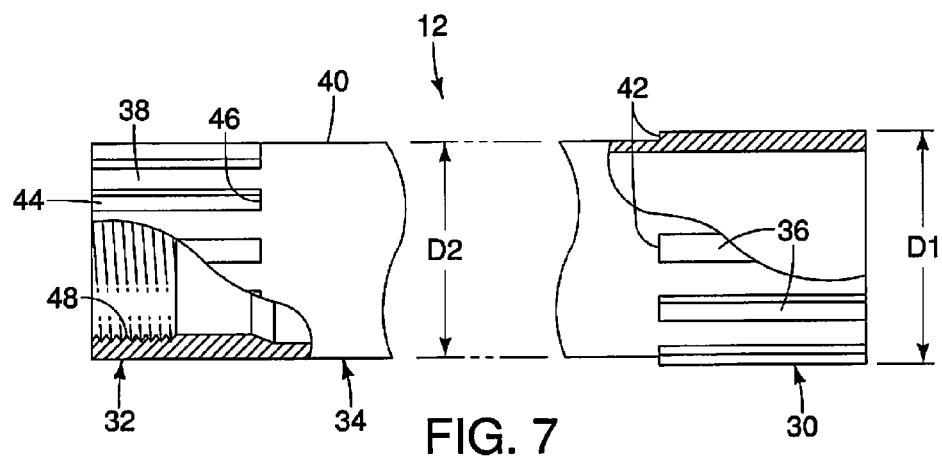
FIG. 7 is an elevational view of the crank axle for the bicycle crank assembly illustrated in FIGS. 1 to 4.

As best seen in FIG. 5, the second crank arm 16 includes a second axle mounting opening 70. The second axle mounting opening 70 of the second crank arm 16 is defined by a second inner splined surface 72. At the opposite end of the second crank arm 16, the pedal attachment portion 68 has a pedal attachment hole 74 that is threaded for threadedly attaching a pedal (not shown). The second inner splined surface 72 engage the second splines 38 to non-rotatably couple the second end portion 32 of the crank axle 12 to the second crank arm 16. The axially facing abutment 46 contacts the second axially inward facing surface 16b of the second crank arm 16 to prevent axially inward movement of the second crank arm 16 on the crank axle 12. The first and second end portions 30 and 32' are dimensioned relative to the first and second axle mounting openings 60 and 70 such that the second end portion 32 must be inserted into the second axle mounting opening 70 from the second axially inward facing surface 16b of the second crank arm 16 toward the second axially outward facing surface 16a of the second crank arm 16 after passing through the first axle mounting opening 60 to dispose the first and second end portions 30 and 32 in the first and second axle mounting openings 60 and 70, respectively.

The assembly of the bicycle crank axle assembly 10 will now be briefly discussed. The crank axle 12 is mounted the first and second crank arms 14 and 16 by inserting the crank axle 12 through the first axle mounting opening 60 from the first axially outward facing surface 14a of the first crank arm 14 to the axially inward facing surface 14b of the first crank arm 14, preferably, until the axially facing abutment 42 of the crank axle 12 contacts the axially facing abutment 64 of the first crank arm 14, or until there is desired amount of an axial gap between the axially facing abutment 42 of the crank axle 12 and the axially facing abutment 64 of the first crank arm 14. In this way, the first end portion 30 of the crank axle 12 is fixedly mounted in the first axle mounting opening 60 of the first crank arm 14 with an interference fit therebetween. Also the first splines 36 engage the splines 62 of the first crank arm 14 to non-rotatably couple the first end portion 30 of the crank axle 12 to the first crank arm 14. The axially facing abutment 64 of the first crank arm 14 contacts the axially facing abutment 42 of the crank axle 12 prevent outward axial movement of the first crank arm 14 away from the second crank arm 16 along the crank axle 12.

Next, the second end portion 32 of the crank axle 12 is insert into the second axle mounting opening 70 from the second axially inward facing surface 16b of the second crank arm 16 to the second axially outward facing surface 16a of the second crank arm 16, preferably, until the second axially facing abutment 46 contacts the second axially inward facing surface 16b of the second crank arm 16, or until there is desired amount of an axial gap between the axially facing abutment 46 of the crank axle 12 and the axially inward facing surface of the second crank arm 16. Finally, the fixing bolt 18 is threaded into the second end portion 32 of the crank axle 12 to secure the second end portion 32 of the crank axle 12 to the second crank arm 16. This, with this first embodiment, the first and second end portions 30 and 32 are dimensioned relative to the first and second axle mounting openings 60 and 70 such that the second end portion 32 must be inserted into the first axle mounting opening 60 from the first axially outward facing surface 14a of the first crank arm 14 toward the first axially inward facing surface 14b of the first crank arm 14 to dispose the first end portion 30 in the first axle mounting opening 60.

Figure 8:
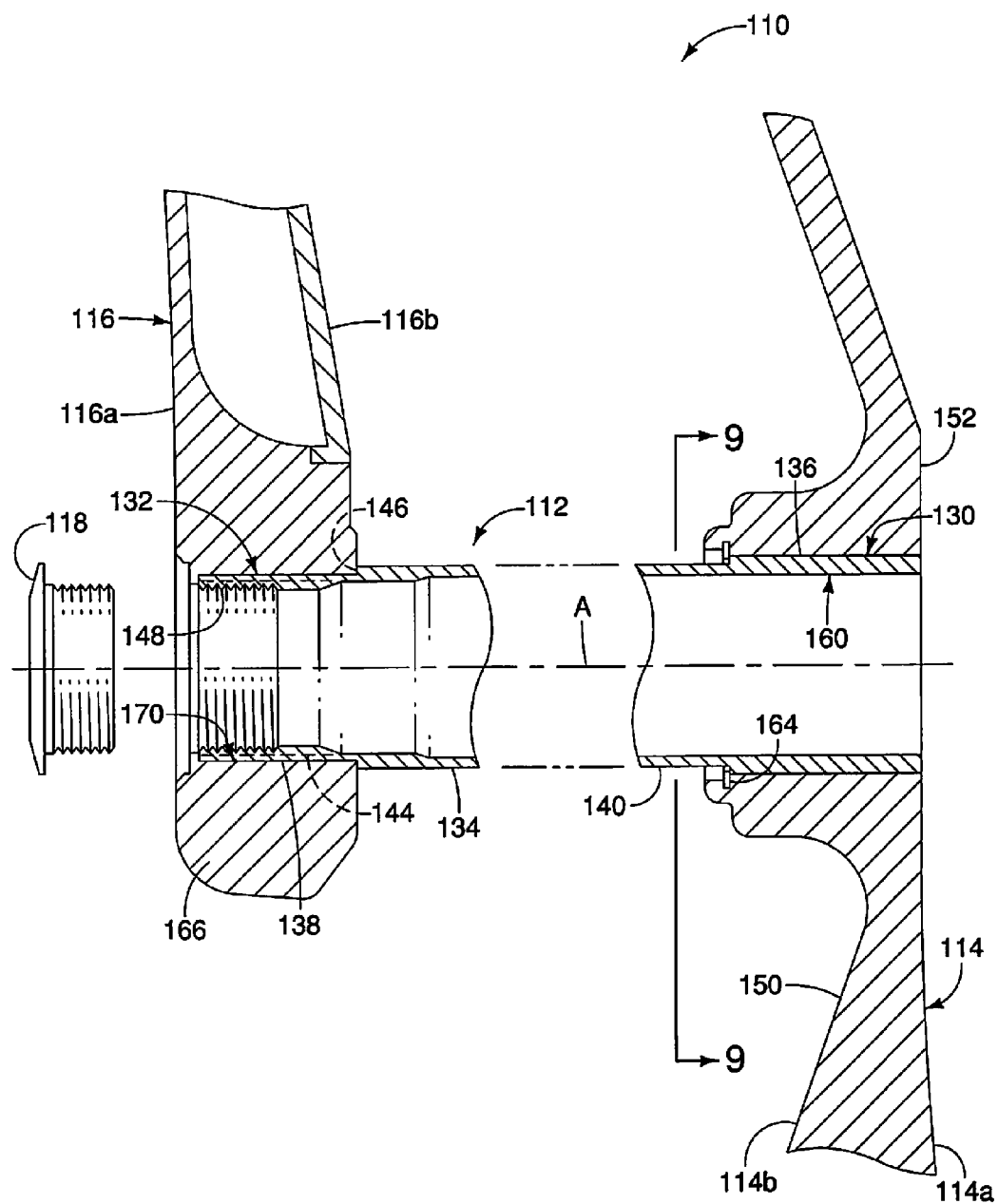
FIG. 8 is an enlarged partial cross sectional view of a bicycle crank assembly in accordance with a second embodiment.
Figure 9:
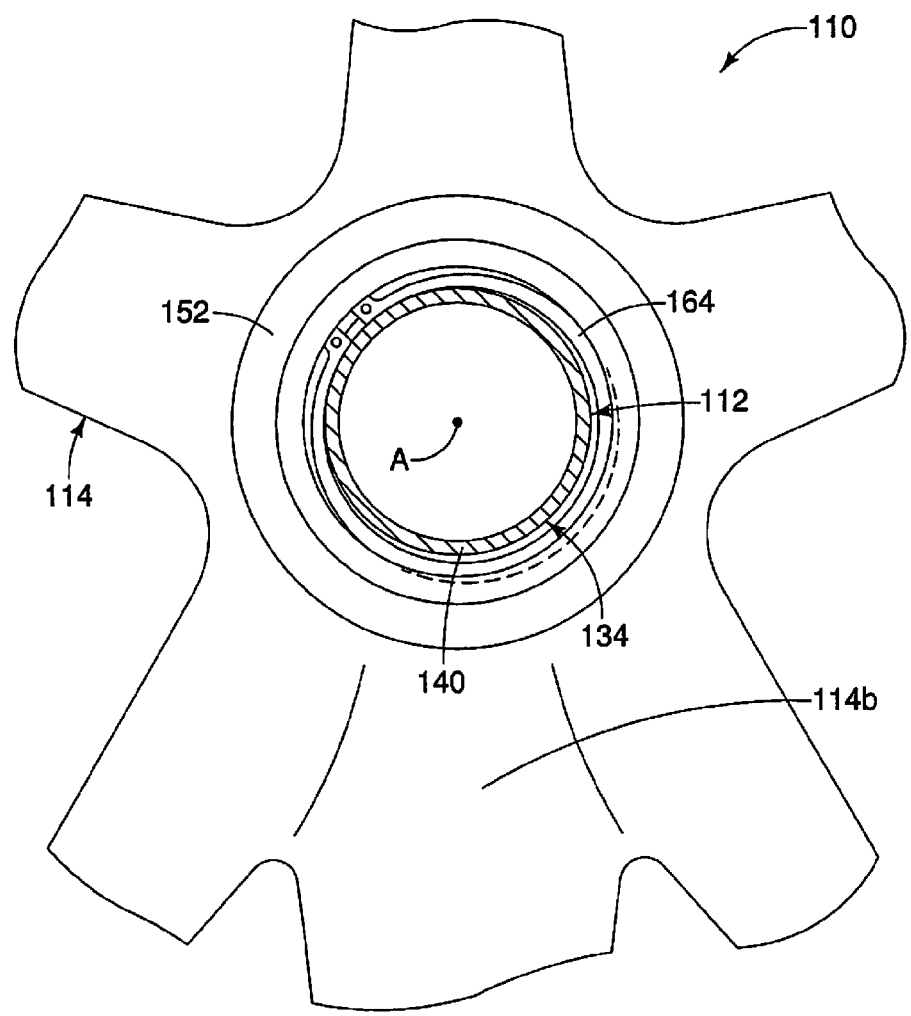
FIG. 9 is a partial cross sectional view of the bicycle crank assembly as viewed along section line 9-9 of FIG. 8.
Figure 10:
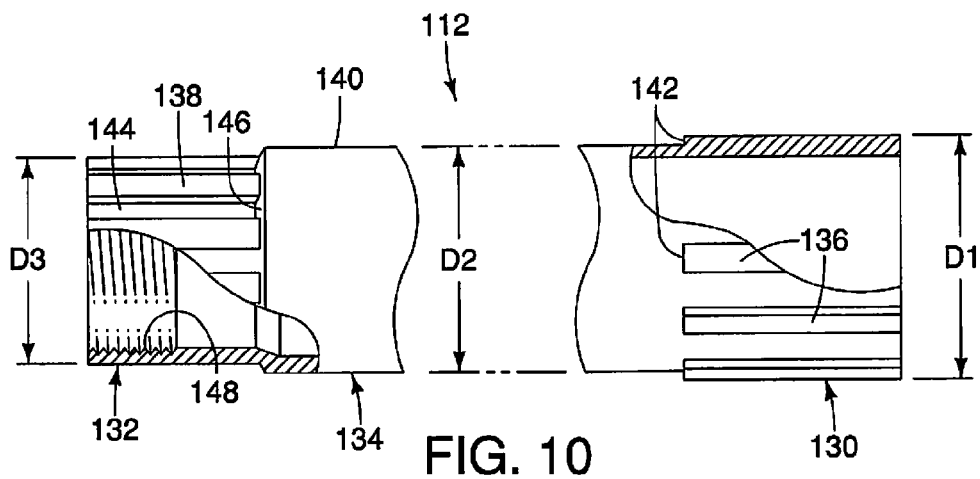
FIG. 10 is an elevational view of the crank axle for the bicycle crank assembly illustrated in FIGS. 8 and 9.

Referring to FIGS. 8 to 10, a bicycle crank axle assembly 110 is illustrated in accordance with a second embodiment. The bicycle crank axle assembly 110 includes a crank axle 112, a first (right) crank arm 114 and a second (left) crank arm 116. Similar to the prior embodiment, the first and second crank arms 114 and 116 are secured to the crank axle 112 using only a fixing bolt 118. The crank axle 112 includes a first end portion 130, a second end portion 132 and a middle body portion 134 located between the first and second end portions 130 and 132. The bicycle crank axle assembly 110 is identical to the bicycle crank axle assembly 10, discussed above, except that the connections between the first and second end portions 130 of the crank axle 112 to the first and second crank arms 114 and 116 have been modified as discussed below. In view of the similarities between the bicycle crank axle assembly 110 and the bicycle crank axle assembly 10, only the features that are different in the bicycle crank axle assembly 110 will be discussed herein.

Here in this second embodiment, as seen in FIG. 10, the second end portion 132 has a maximum outer dimension D3 (diameter or transverse width) that is smaller than the maximum outer dimension D2 (diameter or transverse width) of the middle body portion 134. Similar to the prior embodiment, the first end portion 130 of the crank axle 112 has a plurality of first splines 136, while the second end portion 132 of the crank axle 112 has a plurality of second splines 138. The first splines 136 protrude radially outward from an outer peripheral surface 140 of the middle body portion 134 to define an axially facing abutment 142. The second splines 138 are defined by a plurality of recesses 144 that in the second end portion 132. Each of the second splines 138 has an outermost crest that is recessed with respect to the outer peripheral surface 140 of the middle body portion 134 as seen in FIG. 10. Thus, an axially facing abutment 146 is formed at the interface between second end portion 132 and the middle body portion 134. The second end portion 132 of the crank axle 112 has an internal thread 148 for receiving the fixing bolt 118 to secure the second end portion 132 of the crank axle 112 to the second crank arm 116.

The first crank arm 114 includes a crank body portion 150, a crank axle attachment portion 152 and a plurality of sprocket attachment portions (not shown). The first crank arm 114 has a first axially outward facing surface 114a and a first axially inward facing surface 114b. The crank axle attachment portion 152 has a first axle mounting opening 160 (through bore) that has a plurality of splines (identical to splines 62 of FIG. 6) for engaging the first splines 136 of the crank axle 112 to prevent rotation therebetween. The first crank arm 114 is identical to the first crank arm 14, except that the crank axle attachment portion 152 is provided with a recess is provided around the first axle mounting opening 160 is through bore that receives a C-shaped retaining ring 164 for forming an axially facing abutment that contacts the axially facing abutment 142 of the crank axle 112. Thus, in this embodiment, the axially facing abutment that is a separate piece attached to the crank axle attachment portion 152. While the C-shaped retaining ring 164 is attached to the crank axle attachment portion 152 as the axially facing abutment, the axially facing abutment can have other configurations.

The second crank arm 116 includes a crank axle attachment portion 166 that includes a second axle mounting opening 170. The second crank arm 116 has a second axially outward facing surface 116a and a second axially inward facing surface 116b. The second crank arm 116 is identical to the second crank arm 16, except that the size of the second axle mounting opening 170 has been changed to accommodate the smaller size of the second end portion 132. Thus, similar to the prior embodiment, the crank axle 112 is mounted the first and second crank arms 114 and 116 by inserting the crank axle 112 through the first axle mounting opening 160 from the first axially outward facing surface 114a of the first crank arm 114 to the first axially inward facing surface 114b of the first crank arm 114, preferably, until the axially facing abutment 142 of the crank axle 112 contacts the retaining ring 164, or until there is desired amount of an axial gap between the axially facing abutment 142 of the crank axle 112 and the retaining ring 164 of the first crank arm 114. Next, the second end portion 132 of the crank axle 112 is insert into the second axle mounting opening 170 from the second axially inward facing surface 116b of the second crank arm 116 to the second axially outward facing surface 116a of the second crank arm 116, preferably, until the axially facing abutment 146 contacts the axially inward facing surface 116b of the second crank arm 116, or until there is desired amount of an axial gap between the axially facing abutment 146 of the crank axle 112 and the second axially inward facing surface 116b of the second crank arm 116. Finally, the fixing bolt 118 is threaded into the crank axle 112 to secure the second end portion 132 of the crank axle 112 to the second crank arm 116.

Figure 11:
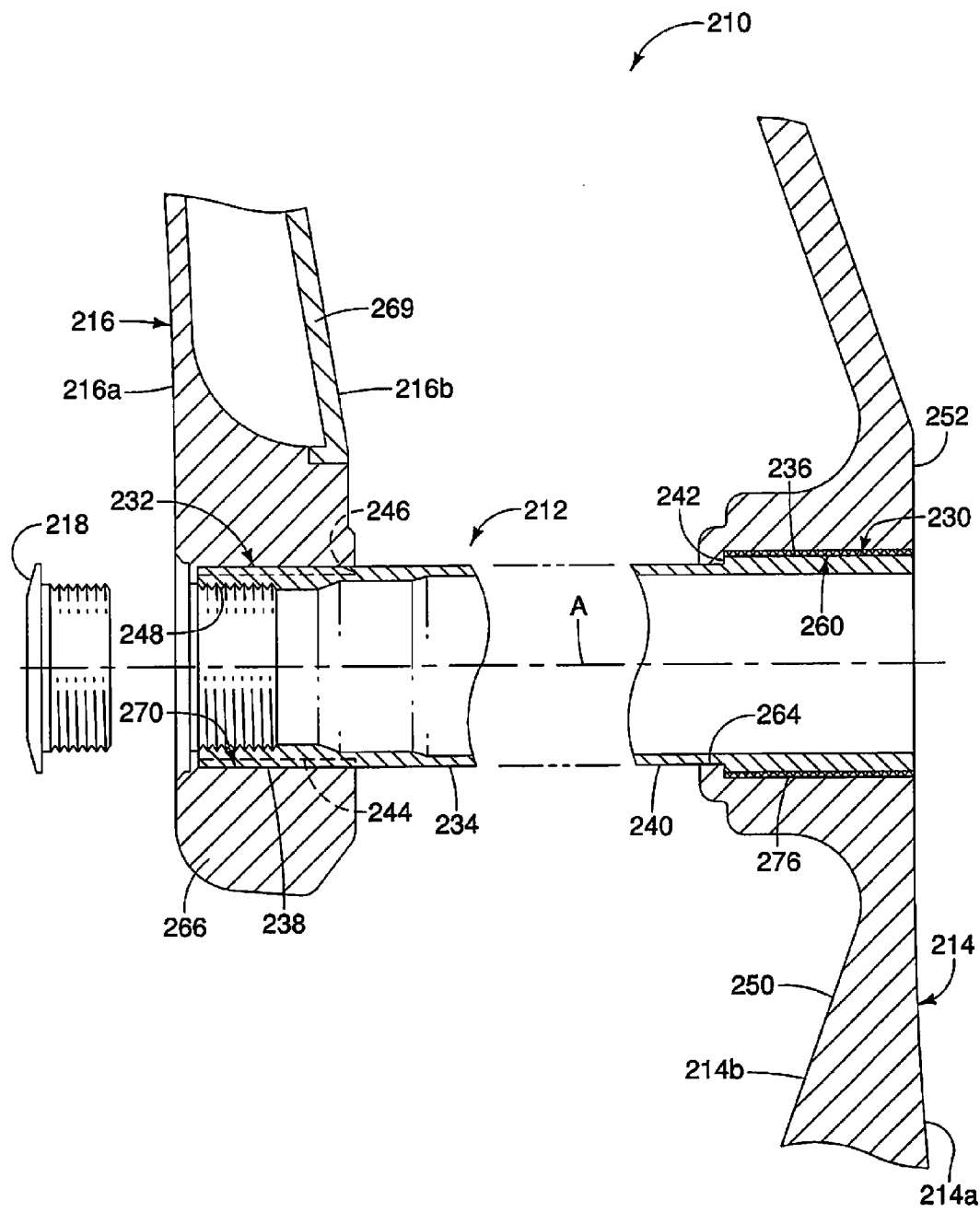
FIG. 11 is an enlarged partial cross sectional view of a bicycle crank assembly in accordance with a third embodiment.

Referring to FIG. 11, a bicycle crank axle assembly 210 is illustrated in accordance with a third embodiment. The bicycle crank axle assembly 210 includes a crank axle 212, a first (right) crank arm 214 and a second (left) crank arm 216. Similar to the prior embodiment, the first and second crank arms 214 and 216 are secured to the crank axle 212 using only a fixing bolt 218. The crank axle 212 includes a first end portion 230, a second end portion 232 and a middle body portion 234 located between the first and second end portions 230 and 232. The bicycle crank axle assembly 210 is identical to the bicycle crank axle assembly 10, discussed above, except that the first crank arm 214 has been modified as discussed below. In view of the similarities between the bicycle crank axle assembly 210 and the bicycle crank axle assembly 10, only the features that are different in the bicycle crank axle assembly 210 will be discussed herein.

Here in this third embodiment, similar to the prior embodiments, the first end portion 230 of the crank axle 212 has a plurality of first splines 236, while the second end portion 232 of the crank axle 212 has a plurality of second splines 238. The first splines 236 protrude radially outward from an outer peripheral surface 240 of the middle body portion 234 to define an axially facing abutment 242. The second splines 238 are defined by a plurality of recesses 244 that in the second end portion 232. Each of the second splines 238 has an outermost crest that is recessed, or almost flush with respect to the outer peripheral surface 240 of the middle body portion 234. Thus, an axially facing abutment 246 is formed at the interface between second end portion 232 and the middle body portion 234. The second end portion 232 of the crank axle 212 has an internal thread 248 for receiving the fixing bolt 218 to secure the second end portion 232 of the crank axle 212 to the second crank arm 216.

The first crank arm 214 includes a crank body portion 250, a crank axle attachment portion 252 and a plurality of sprocket attachment portions (not shown). The first crank arm 214 has a first axially outward facing surface 214a and a first axially inward facing surface 214b. The crank axle attachment portion 252 has a first axle mounting opening 260 (through bore) that has a plurality of splines (identical to splines 62 of FIG. 6) for engaging the first splines 236 of the crank axle 212 to prevent rotation therebetween. The first crank arm 214 is identical to the first crank arm 14, except that the first axle mounting opening 260 is larger than the first axle mounting opening 60. As a result, the crank axle 212 is mounted in the first axle mounting opening 260 of the first crank arm 214 with a non-interference fit (i.e. a non-press-fit) therebetween. Accordingly, the first end portion 230 of the crank axle 212 is attached to the first axle mounting opening 260 by adhesive 276.

The second crank arm 216 includes a crank axle attachment portion 266 that includes a second axle mounting opening 270. The second crank arm 216 has an interior space that is covered by a metallic cover member 269. The second crank arm 216 has a second axially outward facing surface 216a and a second axially inward facing surface 216b. The second crank arm 216 is identical to the second crank arm 16. Thus, similar to the prior embodiments, the crank axle 212 is mounted the first and second crank arms 214 and 216 by inserting the crank axle 212 through the first axle mounting opening 260 from the first axially outward facing surface 214a of the first crank arm 214 to the first axially inward facing surface 214b of the first crank arm 214, preferably, until the axially facing abutment 242 of the crank axle 212 contacts the axially facing abutment 264, or until there is desired amount of an axial gap between the axially facing abutment 242 of the crank axle 212 and the axially facing abutment 264 of the first crank arm 214. Next, the second end portion 232 of the crank axle 212 is insert into the second axle mounting opening 270 from the second axially inward facing surface 216b of the second crank arm 216 to the second axially outward facing surface 216a of the second crank arm 216, preferably, until the axially facing abutment 246 contacts the second axially inward facing surface 216b of the second crank arm 216, or until there is desired amount of an axial gap between the axially facing abutment 246 of the crank axle 212 and the second axially inward facing surface 216b of the second crank arm 216.

Finally, the fixing bolt 218 is threaded into the crank axle 212 to secure the second end portion 232 of the crank axle 212 to the second crank arm 216.

Figure 12:
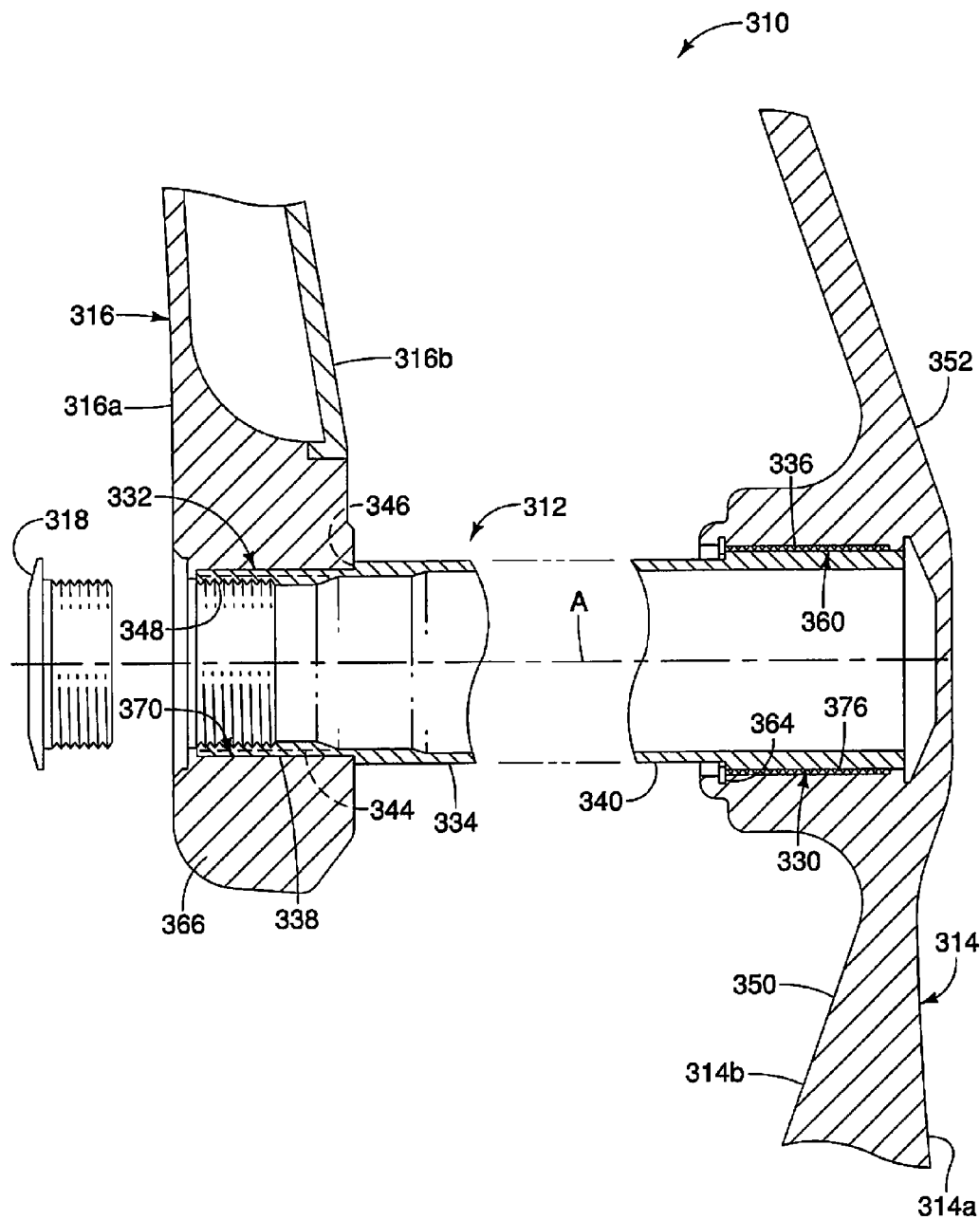
FIG. 12 is an enlarged partial cross sectional view of a bicycle crank assembly in accordance with a fourth embodiment.

Referring to FIG. 12, a bicycle crank axle assembly 310 is illustrated in accordance with a fourth embodiment. The bicycle crank axle assembly 310 includes a crank axle 312, a first (right) crank arm 314 and a second (left) crank arm 316. Similar to the prior embodiment, the first and second crank arms 314 and 316 are secured to the crank axle 312 using only a fixing bolt 318. The crank axle 312 includes a first end portion 330, a second end portion 332 and a middle body portion 334 located between the first and second end portions 330 and 332. The crank axle 312 is identical to the crank axle 12. Moreover, the bicycle crank axle assembly 310 is identical to the bicycle crank axle assembly 110, discussed above, except that the first crank arm 314 has been modified as discussed below. In view of the similarities between the bicycle crank axle assembly 310 and the bicycle crank axle assembly 110, only the features that are different in the bicycle crank axle assembly 310 will be discussed herein.

Here in this fourth embodiment, similar to the prior embodiments, the first end portion 330 of the crank axle 312 has a plurality of first splines 236, while the second end portion 332 of the crank axle 312 has a plurality of second splines 338. The first splines 336 protrude radially outward from an outer peripheral surface 340 of the middle body portion 334 to define an axially facing abutment 342. The second splines 338 are defined by a plurality of recesses 344 that in the second end portion 332. Each of the second splines 338 has an outermost crest that is recessed, or almost flush with respect to the outer peripheral surface 340 of the middle body portion 334. Thus, an axially facing abutment 346 is formed at the interface between second end portion 332 and the middle body portion 334. The second end portion 332 of the crank axle 312 has an internal thread 348 for receiving the fixing bolt 318 to secure the second end portion 332 of the crank axle 312 to the second crank arm 316.

The first crank arm 314 includes a crank body portion 350, a crank axle attachment portion 352 and a plurality of sprocket attachment portions (not shown). The first crank arm 314 has a first axially outward facing surface 314a and a first axially inward facing surface 314b. The first crank arm 314 is identical to the first crank arm 14, except for crank axle attachment portion 352. Here, the crank axle attachment portion 352 has a first axle mounting opening 360 that is a blind bore. The first axle mounting opening 360 has a plurality of splines (identical to splines 62 of FIG. 6) for engaging the first splines 336 of the crank axle 312 to prevent rotation therebetween. However, like the third embodiment, the first axle mounting opening 360 is larger than the first axle mounting opening 60. As a result, the crank axle 312 is mounted in the first axle mounting opening 360 of the first crank arm 314 with a non-interference fit (i.e. a non-press-fit) therebetween. Accordingly, the first end portion 330 of the crank axle 312 is attached to the first axle mounting opening 360 by adhesive 376. Also like the second embodiment, the crank axle attachment portion 352 has a recess is provided around the first axle mounting opening 360 for receiving a C-shaped retaining ring 364 for forming an axially facing abutment that contacts the axially facing abutment 342 of the crank axle 312.

The second crank arm 316 includes a crank axle attachment portion 366 that includes a second axle mounting opening 370. The second crank arm 316 has a second axially outward facing surface 316a and a second axially inward facing surface 316b. The second crank arm 316 is identical to the second crank arm 16, except that the size of the second axle mounting opening 370 has been changed to accommodate the smaller size of the second end portion 332 if each of the second splines 338 has an outermost crest that is recessed with respect to the outer peripheral surface 340 of the middle body portion 334.

Unlike the prior embodiments, due to the first axle mounting opening 360 being a blind bore, the first and second end portions 330 and 332 are dimensioned relative to the first and second axle mounting openings 360 and 370 such that the first and second end portions 330 and 332 must be inserted into the first and second axle mounting openings 360 and 370 from the first and second axially inward facing surfaces 314b and 316b of the first and second crank arms 314 and 316 toward the first and second axially outward facing surfaces 314a and 316a of first and second crank arms 314 and 316.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the above embodiment(s), the following directional terms "forward", "rearward", "above", "downward", "vertical", "horizontal", "below" and "transverse" as well as any other similar directional terms refer to those directions of a bicycle equipped with the bicycle crank axle assembly. Accordingly, these terms, as utilized to describe the bicycle crank axle assembly should be interpreted relative to a bicycle equipped with the bicycle crank axle assembly as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle crank axle assembly comprising:
a first crank arm including a first axle mounting opening that is through bore;
a second crank arm including a second axle mounting opening; and
a crank axle including a first end portion, a second end portion and a middle body portion located between the first and second end portions, the crank axle being mounted in the first axle mounting opening of the first crank arm with a non-interference fit therebetween, and the first end portion of the crank axle is attached to the first axle mounting opening by adhesive,
the first end portion of the crank axle having at least one axially extending first spline that protrudes radially outward from a radial position corresponding to an outer peripheral surface of the middle body portion, the outer peripheral surface of the middle body portion and a base outer peripheral surface of the first end portion excluding the at least one axially extending first spline having equal diameters, the first end portion of the crank axle being disposed in the first axle mounting opening, the at least one axially extending first spline non-rotatably coupling the crank axle to the first crank arm and preventing outward axial movement of the first crank arm away from the second crank arm along the crank axle,
the second end portion of the crank axle having at least one recess that extend radially inward with respect to the outer peripheral surface of the middle body portion to form at least one axially extending second spline, the second end portion of the crank axle being non-rotatably disposed in the second axle mounting opening.

2. The bicycle crank axle assembly according to claim 1, wherein
the at least one axially extending first spline includes a plurality of axially extending splines circumferentially spaced apart around the first end portion of the crank axle.

3. The bicycle crank axle assembly according to claim 1, wherein
the at least one axially extending second spline includes a plurality of axially extending recess circumferentially spaced apart around the second end portion of the crank axle.

4. The bicycle crank axle assembly according to claim 1, wherein
the second spline has an outermost crest that is recessed with respect to the outer peripheral surface of the middle body portion.

5. The bicycle crank axle assembly according to claim 1, wherein
the second spline has an outermost crest that is flush with respect to the outer peripheral surface of the middle body portion.

6. The bicycle crank axle assembly according to claim 1, wherein
the first crank arm includes an axially facing abutment within the first axle mounting opening.

7. The bicycle crank axle assembly according to claim 6, wherein
the axially facing abutment includes at least one projection extending radially inwardly from an inner peripheral surface of the first axle mounting opening.

8. The bicycle crank axle assembly according to claim 6, wherein
the axially facing abutment is an annular projection extending radially inwardly from an inner peripheral surface of the first axle mounting opening.

9. The bicycle crank axle assembly according to claim 6, wherein
the first crank arm includes a pedal attachment portion and a crank axle attachment portion defining the first axle mounting opening, and the axially facing abutment is integrally formed as a unitary piece of the crank axle attachment portion.

10. The bicycle crank axle assembly according to claim 6, wherein
the first crank arm includes a crank axle attachment portion defining the first axle mounting opening, and the axially facing abutment is a separate piece that is attached to the crank axle attachment portion.

11. The bicycle crank axle assembly according to claim 10, wherein
the axially facing abutment is a C-shaped retaining ring that is attached to the crank axle attachment portion.

12. The bicycle crank axle assembly according to claim 1, wherein
the first axle mounting opening of the first crank arm is defined by a first inner splined surface.

13. The bicycle crank axle assembly according to claim 1, wherein
the second axle mounting opening of the second crank arm is defined by a second inner splined surface.

14. The bicycle crank axle assembly according to claim 1, wherein
the second end portion and the middle body portion have a maximum outer dimension that is smaller than a minimum inner dimension of the first axle mounting opening.

15. The bicycle crank axle assembly according to claim 1, wherein
the second end portion and the middle body portion are shaped so that the second end portion and the middle body portion are capable of freely passing through the first axle mounting opening.

16. The bicycle crank axle assembly according to claim 1, wherein
the first and second end portions are dimensioned relative to the first and second axle mounting openings such that the second end portion must be inserted into the first axle mounting opening from a first axially outward facing surface of the first crank arm toward a first axially inward facing surface of the first crank arm to dispose the first end portion in the first axle mounting opening.

17. The bicycle crank axle assembly according to claim 1, wherein
the first and second end portions are dimensioned relative to the first and second axle mounting openings such that the second end portion must be inserted into the second axle mounting opening from the second axially inward facing surface toward the second axially outward facing surface after passing through the first axle mounting opening to dispose the first and second end portions in the first and second axle mounting openings, respectively.

* * * * *